(12) United States Patent
Rippelmeyer et al.

(10) Patent No.: US 10,744,889 B1
(45) Date of Patent: Aug. 18, 2020

(54) METHOD OF DRIVE QUALITY CONTROL AND SHIFT MANAGEMENT FOR ELECTRIC VEHICLES INVOLVING MULTIPLE TRACTION DRIVE MOTORS

(71) Applicant: TOYOTA MOTOR ENGINEERING & MANUFACTURING NORTH AMERICA, INC., Plano, TX (US)

(72) Inventors: Luke Alan Rippelmeyer, Plano, TX (US); Christopher M. Bulpitt, Los Angeles, CA (US); Ronald J. Toth, Redondo Beach, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/388,064

(22) Filed: Apr. 18, 2019

(51) Int. Cl.
```
B60W 10/08     (2006.01)
B60W 10/10     (2012.01)
B60L 15/20     (2006.01)
B60W 10/11     (2012.01)
B60K 1/02      (2006.01)
```
(52) U.S. Cl.
CPC ............ *B60L 15/2054* (2013.01); *B60K 1/02* (2013.01); *B60W 10/08* (2013.01); *B60W 10/11* (2013.01); *B60L 2220/42* (2013.01); *B60L 2240/421* (2013.01); *B60L 2240/423* (2013.01); *B60W 2510/081* (2013.01); *B60W 2510/083* (2013.01)

(58) Field of Classification Search
CPC ...... B60W 10/08; B60W 10/10; B60W 30/20; B60W 2510/10; B60W 2510/109; B60W 2540/10; B60W 2710/08; B60W 2710/081; B60W 2710/083; B60L 15/20
See application file for complete search history.

(56) References Cited

U.S. PATENT DOCUMENTS

| | | | |
|---|---|---|---|
| 4,458,182 A | 7/1984 | Suter et al. | |
| 4,555,651 A | 11/1985 | Melocik et al. | |
| 5,845,731 A * | 12/1998 | Buglione | B60K 6/26 180/65.23 |
| 7,836,986 B1 * | 11/2010 | Gillecriosd | B60W 20/40 180/65.21 |
| 8,010,263 B2 | 8/2011 | Morris | |
| 9,415,694 B2 | 8/2016 | Matsuda | |
| 9,623,872 B2 | 4/2017 | Zhu et al. | |
| 2014/0342872 A1 * | 11/2014 | Imai | B60K 6/26 477/5 |

* cited by examiner

*Primary Examiner* — Edwin A Young
(74) *Attorney, Agent, or Firm* — Oblon, McClelland, Maier & Neustadt, L.L.P.

(57) ABSTRACT

A control apparatus and method for a two motor drive system of an electric vehicle A spline connects the two Motors, and a second spline connects a motor to a transmission. The control apparatus is configured to in positive driving traction, initiate torque change of the first motor and delay torque change of the second motor, in negative driving traction, initiate torque change of the second motor and delay torque change of the first motor, in downshift of the transmission, initiate torque change of the first motor and delay torque change of the second motor, and in upshift of the transmission, initiate torque change of the second motor and delay torque change of the first motor. The control of torque and the initiation sequence of torque change between the two motors is such that impacts from backlash are substantially reduced, and vibration and noise phenomena are minimal.

20 Claims, 6 Drawing Sheets

METHOD OF DRIVE QUALITY CONTROL AND SHIFT MANAGEMENT FOR ELECTRIC VEHICLES INVOLVING MULTIPLE TRACTION DRIVE MOTORS

BACKGROUND

Technical Field

The present disclosure is directed to reduction of backlash impacts between motor to motor connections and motor to transmission connections in a drive system for an electric vehicle. The present invention relates to control of an automatic manual transmission for an electric vehicle in a manner that reduces overall energy loss and enables improved shift times.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electric vehicles (EVs) are becoming more widespread as issues over environment and fuel economy become of increased concern. An EV typically uses one or more electric motors to drive the vehicle. The source of electricity may be from off-vehicle sources, or may be self-contained with a battery, solar panels or an electric generator. EVs many be classified into types of vehicles for traveling by rail, road, on water or underwater, air and space. Similar to non-electric vehicles, most road electric vehicles incorporate a single electric motor for travel. Larger electric vehicles, such as heavy duty trucks may incorporate more than one electric motor.

When more than one electric motor is used to drive a vehicle, the electric motors may be arranged in series, in parallel, or in a combination of series and parallel. Multiple electric motors may be interconnected with each other, as well as with a transmission system. The multiple electric motors typically transmit torque/power through one or more idler shafts to a center shaft and out to the wheels of the vehicle. Each interconnection may be impacted by backlash and vibrations that may lead to noise, jerky motions and other undesirable effects.

It is one object of the present disclosure to describe a control approach for a two motor arrangement that reduces backlash, vibration and other noise phenomena. Other objectives include speed synchronizing between the motors speed and vehicle speed as perceived from a gear dog clutch to achieve faster shift times. In some aspects the control approach utilizes a cost function that reduces drive system energy loss.

SUMMARY

An exemplary embodiment relates to a control apparatus for a drive system of an electric vehicle, wherein the drive system includes a first motor connected to a second motor by a first spline, and a second spline connecting the second motor to a transmission, the control apparatus including circuitry configured to in positive driving traction, initiate torque or speed change of the first motor and delay torque or speed change of the second motor, in negative driving traction, initiate torque or speed change of the second motor and delay torque or speed change of the first motor, in downshift of the transmission, initiate torque or speed change of the first motor and delay torque or speed change of the second motor, and in upshift of the transmission, initiate torque or speed change of the second motor and delay torque or speed change of the first motor.

Another exemplary embodiment relates to a method for a drive system of an electric vehicle, wherein the drive system includes a first motor connected to a second motor by a first spline, and a second spline connecting the second motor to a transmission, the control method including in positive driving traction, initiating torque or speed change of the first motor and delaying torque or speed change of the second motor; in negative driving traction, initiating torque or speed change of the second motor and delaying torque or speed change of the first motor; in downshift of the transmission, initiating torque or speed change of the first motor and delaying torque or speed change of the second motor; and in upshift of the transmission, initiating torque or speed change of the second motor and delaying torque or speed change of the first motor.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an automatic manual type transmission driven by at least two electric motors. The connection between a pair of electric motors may, be a spline connection. The connection between a motor and the transmission may also be a spline connection. The control of the drive system is in a manner that reduces vibration, noise, and impacts from backlash during acceleration and gear shifting, and that reduces energy loss.

Figures 1A, 1B:
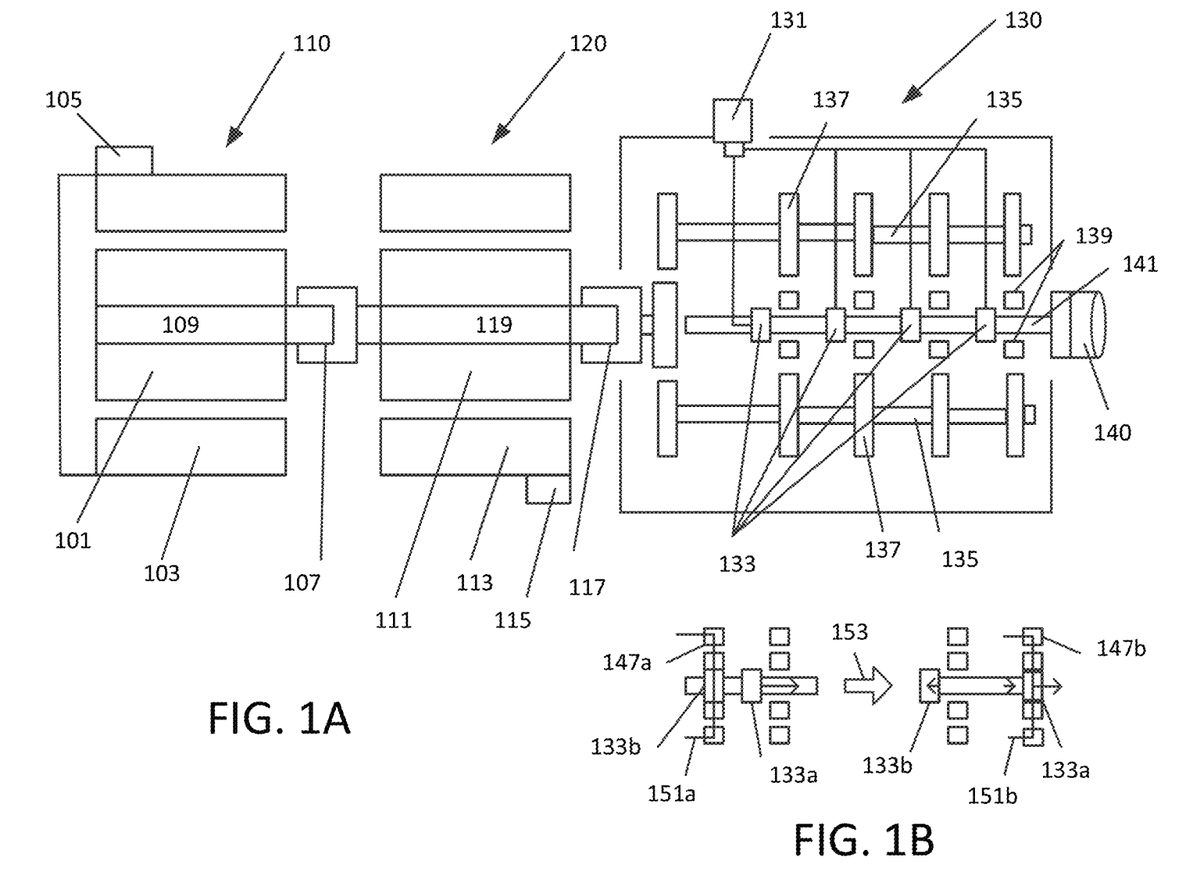
FIGS. 1A and 1B are a block diagram of drive system structure and gear shift operation, in accordance with an exemplary aspect of the disclosure.

FIG. 1A is a block diagram of drive system structure, in accordance with an exemplary aspect of the disclosure. The drive system structure may include a pair of electric motors 110 and 120 connected in series by spline connection 107 and a transmission 130 having a dog type clutch structure. The transmission 130 may be connected to a motor 120 through a spline connection 117 as well. The transmission 130 is connected to a drive shaft through a driveshaft yoke 140.

The electric motors 110, 120 each include a rotor and a stator. The electric motor 110 includes a rotor 101 and a stator 103. The rotor 101 is connected to and rotates with a respective shaft 109. The electric motor 120 includes a rotor 111 and stator 113. The rotor 111 is connected to and rotates with a respective shaft 119. In each case, power from an inverter travels through a respective terminal 105, 115 and energizes the respective stator 103, 113, and causes the respective rotor 101, 111 to turn.

The electric motors 110 and 120 each include motor speed control circuitry. The electric motor 110 may be electrically connected to an inverter circuit through a terminal 105. The electric motor 120 may be electrically connected to an inverter circuit through a terminal 115. Inverter circuits produce a variable output voltage range. The DC power for the inverter circuit can be derived from a normal AC wall outlet or some other source. The motor speed control circuitry includes control and feedback circuitry to adjust the final output of the inverter circuitry which ultimately determines the speed of the motor operating under its mechanical load.

The dog type clutch structure of the transmission 130 may include a number of dog clutches that correspond to the number of gears. Although the drawing shows four dog clutches 133 and four gears, the number of clutches and gears may vary in a range from three to eighteen. The transmission 130 may include a number of idler shafts 135 on which gears 137 may be mounted. The arrangement of idler shafts depends on the number of gears and the number of gears mounted to a shaft. The dog clutches 133 are configured to move forward and backward along a main shaft 141 to engage different main gears 139 of the transmission 130. The structure of a dog clutch 133 may be an annular ring having straight teeth inside and outside. The inside teeth mesh with teeth of the main shaft 141. The outside teeth mesh with inner teeth of a main gear 139. Movement of the dog clutches 133 along a shaft 141 may be by way of shift forks and actuators 131. For example, an actuator system may include one or more solenoids that, push the dog clutches 133 on the main shaft 141 forward or backward in order to engage a particular gear.

FIG. 1B illustrates operation of gear shifting in the transmission 130. In the originating gear, shift fork 147a has been actuated to a position where torque is transferred from the main shaft 141, through dog clutch 133b to the idler shafts in torque path 151a. During a gear shift 153, dog clutch 133a is actuated to disengage dog clutch 133h. Then, to engage the next gear shift, fork 147b is actuated to move the dog clutch 133a into a position where it engages with the main shaft 141 and transfers the torque through itself to the idler shafts in torque path 151b.

Figures 2A, 2B:
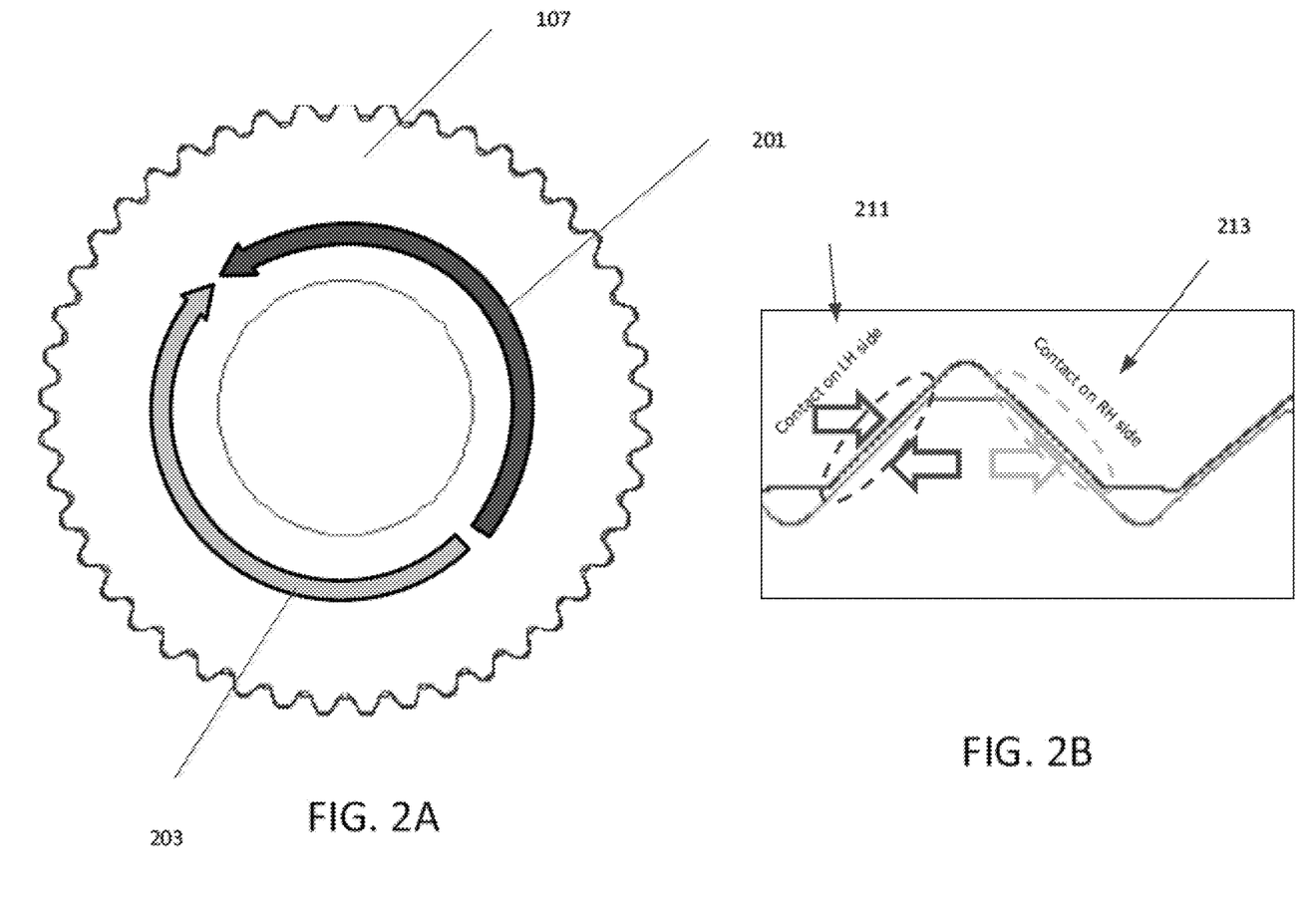
FIGS. 2A and 2B are diagrams that illustrate spline impacts.

FIGS. 2A and 2B are diagrams that illustrate impacts during spline operation due to torque or speed changes in motors that use the spline for power transfer connection. A spline 107 (117) is an annular structure with teeth on its outer side. The spline 107 (117) spins with a respective shaft (e.g., 109 or 119 in FIG. 1A). While the transmission is in a gear, the driver may perform actions using the acceleration (gas) pedal of the vehicle. The driver may press the acceleration pedal to, cause acceleration of the vehicle (or positive traction). The driver may lift off of the acceleration pedal and allow the vehicle to coast (herein referred to as coasting or negative traction). The driver may retract the acceleration pedal a certain amount to cause regeneration (or negative traction). When the vehicle is accelerating, the motor, e.g., 110, is pushing 203, which creates contact on the right hand side 213 of the spline teeth. When the vehicle is coasting or undergoing regeneration, the vehicle's mass is pulling the motor, e.g., 110, along or the motor torque is in the opposite direction 201. Pulling the motor during coasting or regeneration creates a spline tooth contact on the left hand side 211 of the spline teeth. Rapid changes between positive 203 and negative 201 torque directions, for example changing from acceleration to coasting, changing from acceleration to regeneration, or sudden acceleration, may cause unwanted vibration, noise, and poor drivability.

Backlash is a loss caused by gaps between mated gear teeth. For example, there are gaps between spline teeth and teeth of a motor connection. When the direction of torque of the spline is changed from positive 203 to negative 201, lost motion is taken up before the change of torque direction. In particular, the outside teeth of the spline have a gap with teeth of the motor connection, so that when the direction of torque changes from one direction to another, that gap first gets overtaken, i.e., the spline teeth move without applying torque to the motor teeth. In the case of a motor to motor connection, when one of the motors is pushing and changes torque direction, and the change in direction is faster than the other motor, the motor will start spinning the other way and slam the other motor connection. This slamming of the other motor connection causes a vibration that will transfer down to the wheels, which the driver will feel. Also, over time the repeated slamming against the other motor may cause damage to parts.

The drive system in FIG. 1A performs several energy conversions including the final conversion of electric power to mechanical power to turn wheels of a vehicle. Each conversion is subject to losses. In the drive system, each electric motor has a conversion efficiency. The electric motor efficiency is the ratio between power output (mechanical) and power input (electrical). Mechanical power output is calculated based on the torque and speed required to move an object. Electric power input is calculated based on voltage and current supplied to the motor. Energy is lost during conversion of electrical to mechanical power due to factors such as heat and friction. The electric motor may be characterized by one or more efficiency maps. An efficiency map relates torque, speed and efficiency at specified conditions including coolant temperature and motor voltage. Efficiency maps are used in calculations for control by an Engine Control Unit (ECU). In the case of two electric motors that power wheels through a transmission, torque and speed of each motor can affect total energy loss.

Each motor may be controlled by a respective engine control unit (ECU). A vehicle may include one or more master control units, where at least one master control unit is connected to the motor ECUs. In particular, an inverter supplies DC current to a respective electric motor under control of the engine control unit. The inverter decides which of the coils within the motor to provide current to in order to push the motor around. The inverter gets feedback based on the target torque or gets feedback based upon the target speed. The control mode for the motors can be changed electronically based upon control signals from a master control unit and depending on operation of a cruise control circuit. If the control mode is speed mode, the master control unit will issue control signals to try to keep motors in a certain speed to keep the vehicle at a certain speed. If an acceleration pedal is pressed to accelerate the vehicle, the master control unit will issue a certain acceleration response, and will control the motors to be in torque mode so that the acceleration can be controlled cleanly.

Each motor may be operated in speed mode or torque mode. Speed mode is a mode in which the speed of the motor is controlled, typically in rotations per minute (RPM). Torque mode is a mode in which a certain amount of torque is produced by a motor, typically Newton meter or foot pounds. For example, during driving under control of a cruise control circuit, both motors may be operated in a speed control mode. During acceleration by operation of the acceleration pedal, both motors may be operated in a torque control mode. During a gear shift by the transmission, one motor may be torque controlled while the other motor may be speed controlled.

Figure 3:
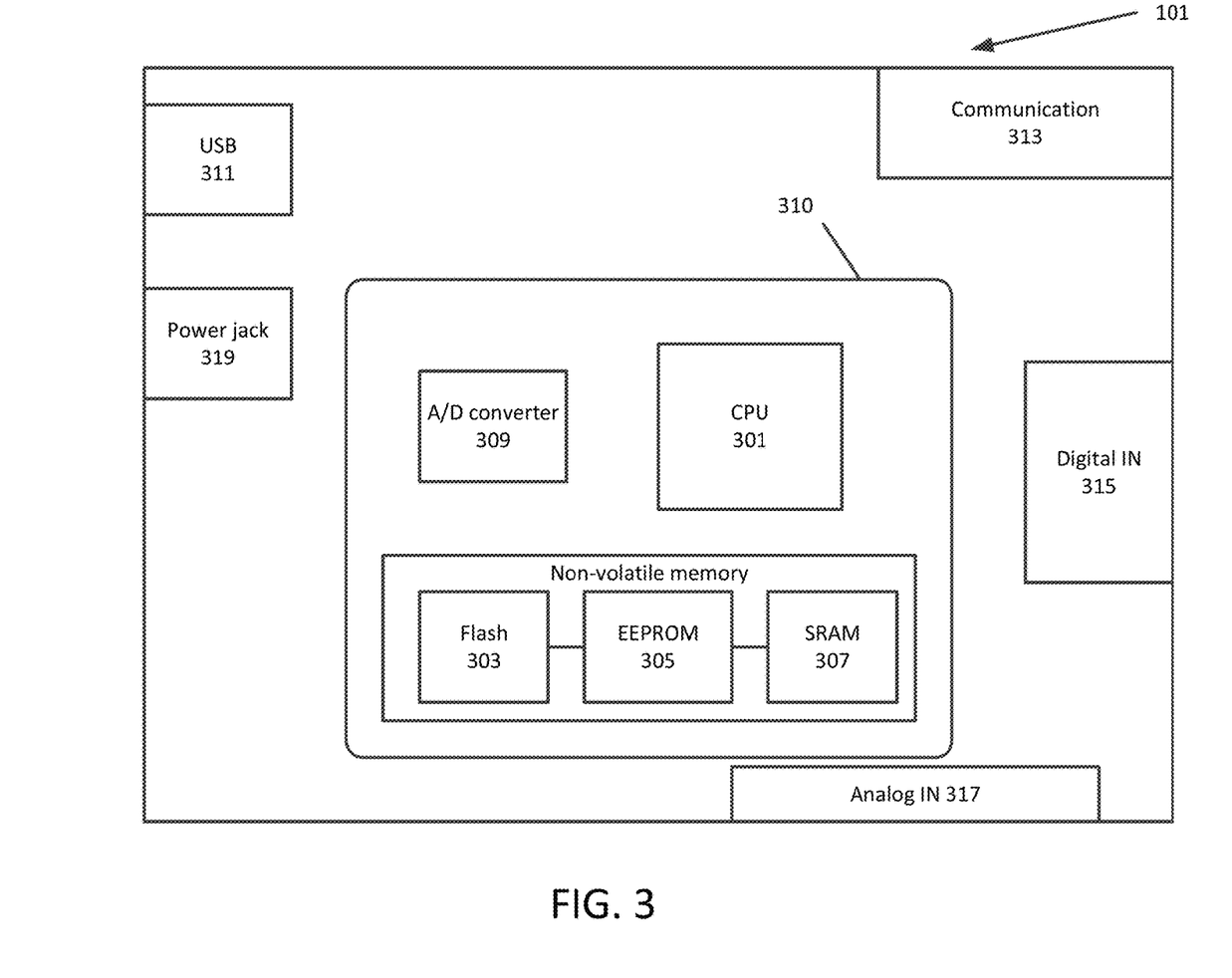
FIG. 3 is a block diagram of a computer controller as an exemplary engine control unit in accordance with an exemplary aspect of the disclosure.

The ECU 101, master control units, and other computer-based control units may be based on a microcontroller. FIG. 3 is a block diagram of a computer controller as an exemplary engine control unit in accordance with an exemplary aspect of the disclosure. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 101 is an integrated circuit board with a microcontroller 310. The board may include digital I/O pins 315, analog inputs 317, hardware serial ports 313, a USB connection 311, and a power jack 319. It should be understood that other microcontroller configurations are possible. Variations can include the number of pins, whether or not the board includes communication ports or a reset button.

In some embodiments, the microcontroller may be an 8-bit AVR RISC-based microcontroller having flash memory 303, SRAM 307, EEPROM 305, general purpose I/O lines, general purpose registers, a real time counter, six flexible timer/counters, a A/D converter 309, and a JTAG interface for on-chip debugging. The microcontroller may be a single SOC. It should be understood that other microcontrollers may be used. Microcontrollers vary based on the number of processing cores, size of non-volatile memory, the size of data memory, as well as whether or not it includes an A/D converter or D/A converter.

In order to reduce impacts due to backlash, vibration and noise while driving, torque changes are controlled for each motor. In particular, aspects include creating an intentional time delay such that one motor changes its torque or speed slower than the other motor. Provided this time delay, the motor maintains the space in the spline closed, so that gap does not open, and does not have any contact. The backlash does not open and close during a torque change. In other words, the gap in the spline teeth and the two motors is kept closed, so that motors and spline do not rattle against each other. In some embodiments, the time delay is less than one second, and in particular, less than one tenth of a second.

Figure 4:
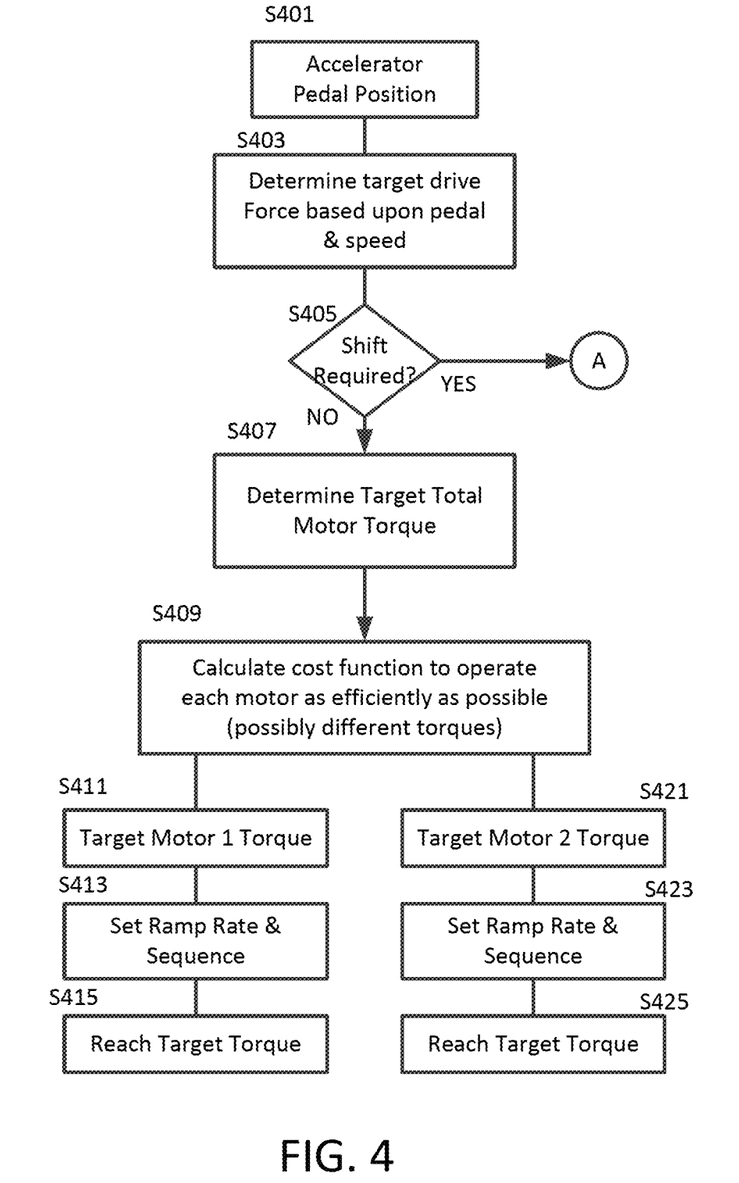
FIG. 4 is a flowchart for a control method during driving in accordance with an exemplary aspect of the disclosure.

Also, aspects include control of the torque of each motor so that, power conversion efficiency is maximum A cost function may be implemented to determine the amount of torque to be applied to each motor. The cost function may be performed by an ECU, or in the vehicle control system circuitry. The cost function may determine that both motors are operated at the same torque or at different torque in a manner that maximizes energy efficiency of the motors. FIG. 4 is a flowchart for a control method by a master control unit and ECUs during driving in accordance with an exemplary aspect of the disclosure.

During driving of a vehicle, in S401, the position of the accelerator pedal may be changed/moved to indicate acceleration, and after reaching desired speed the position of the accelerator pedal may again be changed to indicate a back force. The change in position of the accelerator pedal may be indicated by an electric signal that is received by an ECU, or a master control unit (generally referred to herein as control unit), in the vehicle. The control unit also receives and maintains information on vehicle speed. In S403, the control unit determines a target drive force based on the change in accelerator pedal position and current vehicle speed. The target drive force, as referred to herein, relates to the force to be applied to the vehicle wheels. In S405, the target drive force is used in determining whether a gear shift is required or if the target drive force can be achieved without changing gears. When a gear shift is not required (NO in S405), in S407, the control unit determines the target total motor torque to accelerate the vehicle based on the change in accelerator pedal position. The target total motor torque relates to the amount of torque that a motor ideally needs to create to achieve an approximate target drive force. In a similar manner, when both motors are operated in a speed operation mode, the control unit determines a target motor speed to accelerate the vehicle.

An aspect is a control unit that performs an optimization function in accordance with a cost function to control operation of each motor to achieve maximum power efficiency. The optimization function determines the torque or speed that each motor will be operated based on the target total motor torque and each motor's efficiency map. The optimization function may be performed by a master control unit by setting out a set of options, including one option to operate both motors at the same torque, or another option to operate both motors at different torques, and the amount of torque that each motor will operate at. The master control unit will apply the cost function to each option and determine the option that achieves the best power efficiency. In S411, S421, provided the selected option the target motor torque, or speed, will be determined for each motor, respectively.

Typically, the torque amount for each motor is synchronized to change at exactly the same time. However, changing torque of each motor, at the same time has been determined as being a cause of jerking and vibration at the splines due to the above-described gaps. Also, each motor may not actually react to the torque change signal at the same time. One motor may react faster than the other motor due to factors such as the length of the control signal line, the amount that a motor may be off balance, or the amount of drag in a motor's bearings.

Figure 5:
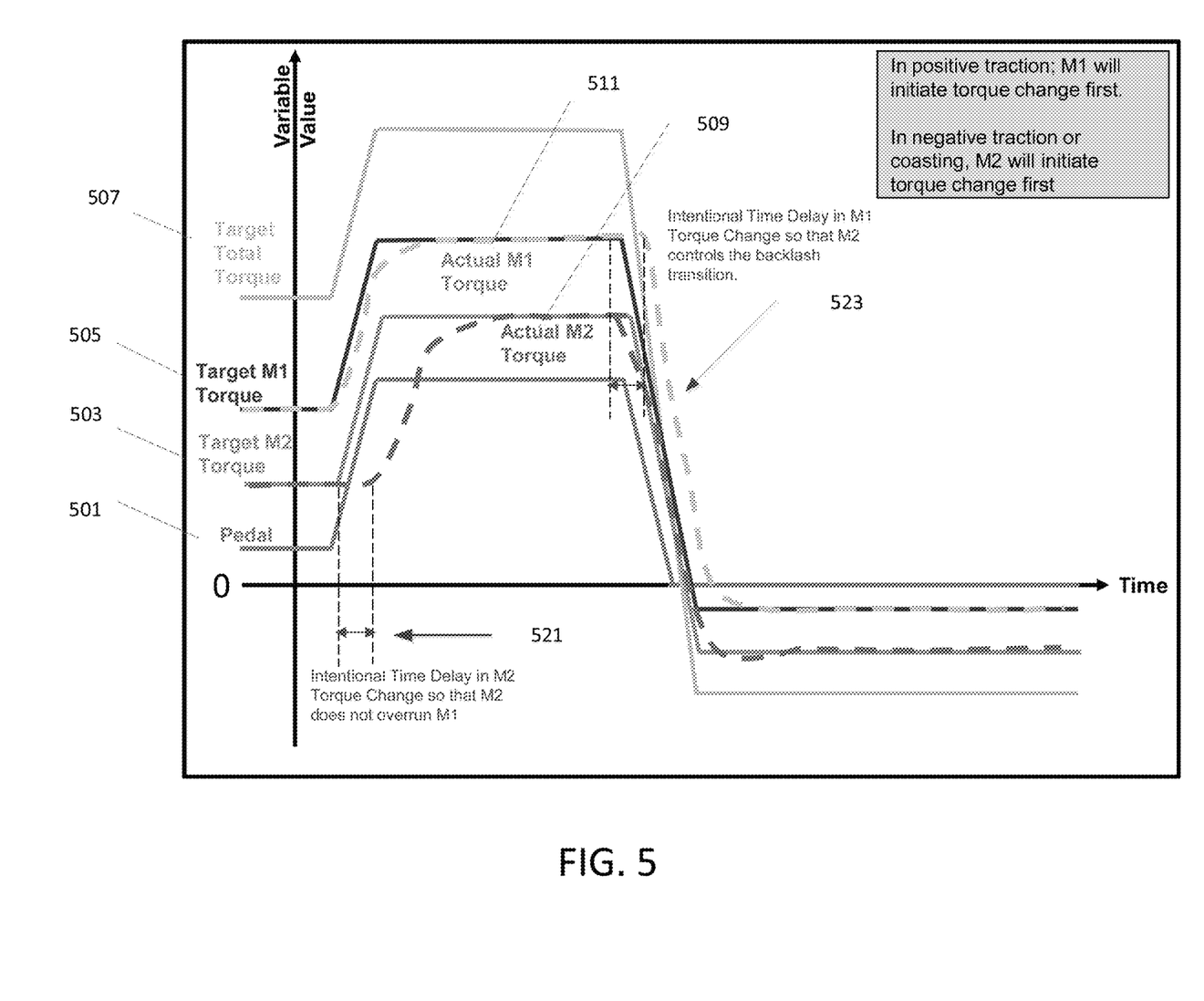
FIG. 5 is a graph of torque characteristics during driving in accordance with an exemplary aspect of the disclosure.

An aspect is to insert an intentional time delay between sending of the torque change signals to each motor and to order the torque change signals. FIG. 5 is a graph of torque characteristics during driving, without shifting gears, in accordance with an exemplary aspect of the disclosure. In S413, S423, the control unit for each motor will set an actual ramp rate 503, 505 (rate that the motor will increase torque over a period of time) and the sequence of torque or speed initiation to achieve the total target torque or speed 507 based on the change in the accelerator pedal position 501. When the change in the accelerator pedal direction indicates acceleration, torque is in positive traction, Motor 110 will initiate torque change first by the control unit sending a torque change signal at a time point that takes into consideration factors that influence torque change in the motor. The torque change signal for Motor 120 will be sent, after a time delay 521. After reaching the target torque, the accelerator pedal may indicate a back force, negative traction or coasting, Motor 120 will initiate torque change first. The torque change signal for Motor 110 will be sent after a time delay 523. The control unit mar send a torque or speed change signal to each motor based on a predetermined time delay of a fraction of a second, for example, less than a tenth of a second. In positive traction, the actual motor torque or speed 509 will be delayed for Motor 120, so that Motor 120 actual torque 511 does not overrun Motor 110. In S415, S425, the Motors 110 and 120 reach their respective target torque. To minimize jerk motion due to backlash, the gap between, motor connections at the spline is kept closed. An intentional time delay or a predetermined amount 523 may be applied w the torque change signal for Motor 110, so that Motor 120 controls backlash transition.

In S405, it may be determined that the target drive force based on the change in the accelerator pedal position indicates that a gear shift is required between gears of the transmission. A gear shift may be accomplished by speed synchronizing between the motor(s) speed and vehicle speed as perceived by the oncoming gear dog clutch. Both motors are used to synchronize this speed enabling faster overall shifts times. Also, a backlash relationship must be maintained not only when the vehicle is in gear, but also during a gear shift. During gear shift, the transmission must go to neutral (zero torque) in between each gear. While in neutral, each motor changes its speed so that when the new gear is engaged, it is at the correct speed relationship relative to the new gear and the vehicle speed.

Figure 6:
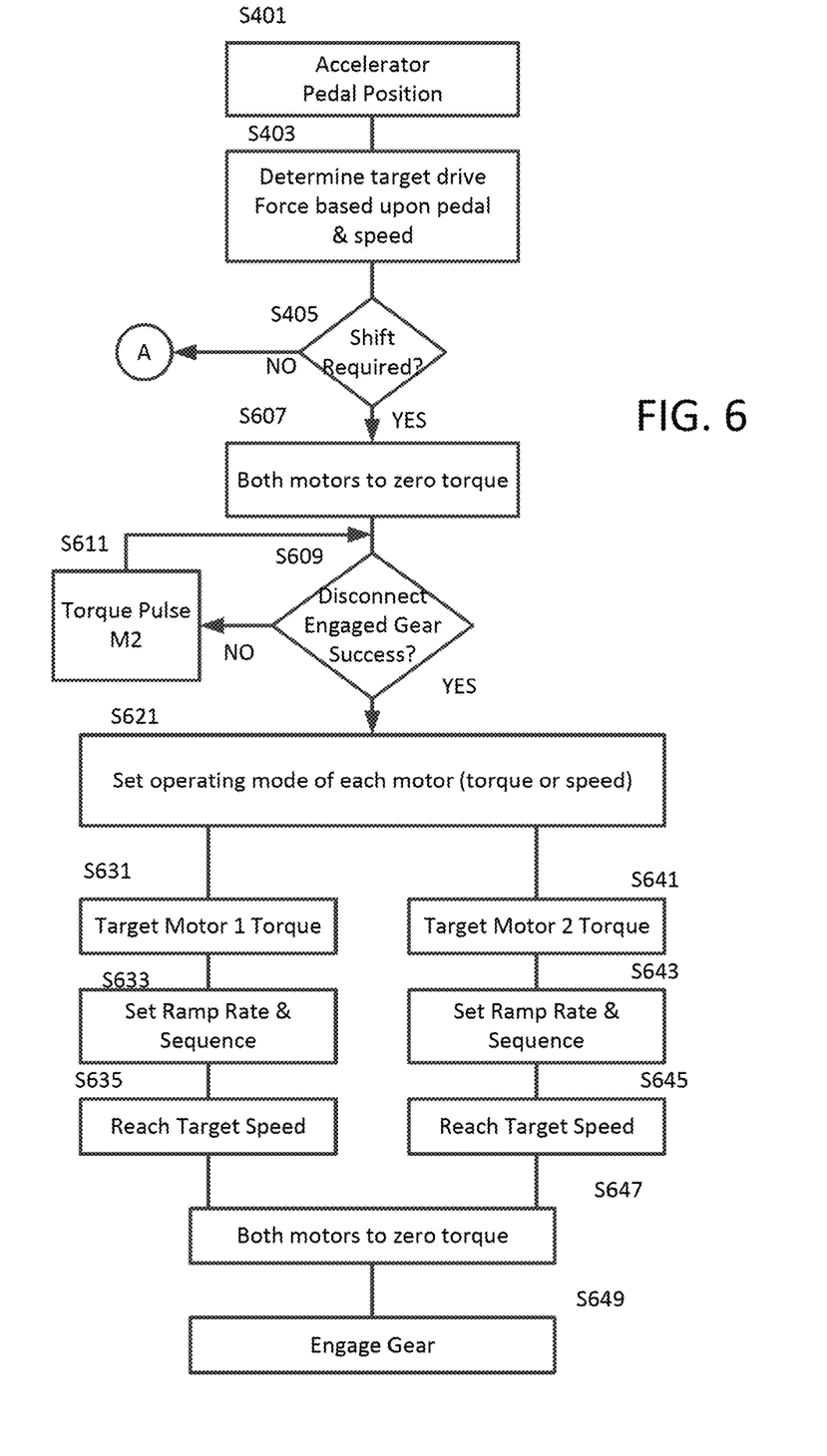
FIG. 6 is a flowchart for a control method during gear shift operation in accordance with an exemplary aspect of the disclosure.

FIG. 6 is a flowchart for a control method when a gear shift operation is made in accordance with an exemplary aspect of the disclosure. In S607, due to a shift request made from a transmission control unit, both motors are controlled to go to zero torque. At zero torque, the dog clutch for a respective gear may be disconnected so that the transmission can go to neutral. Zero torque may be determined based on a state of the motor in which its magnetic field reaches a certain level. In S611, motor torque continues to be adjusted until both motors are at zero torque and gear has been disconnected. Subsequently, when the motors are at zero torque, dog clutches disengage. When the dog clutch disconnects only the motors and transmission input shaft are connected. The transmission is not connected all the way to the wheel. When engaged gears are disconnected via a dog clutch, YES in S609, in S621, the operating mode of each motor is set and a new target torque or speed is set. Depending on the type of gear shift, one motor may be set to zero torque while the other motor may be set to a certain speed or torque. In S631, S641, motor 110 and 120 are set to a target torque or speed.

For example, when going from $1^{st}$ gear (4:1) to $2^{nd}$ gear (2:1), and the motor speed is 2000 rpm, the target speed before the driveline can be reengaged to the wheels may be 1000 rpm. Thus in S631. S641, the motor torque (target speed) is set so that it gets to 1000 rpm as quickly as possible (within control limits).

In some embodiments, the control unit may send the signal for changing the torque of the second motor 120 based on a delay of a predetermined time period, for example, less than a tenth of a second. In a gear upshift, the torque change of the second motor 120 will be initiated before the torque change of the first motor 110. The control unit may send the signal for changing the torque of the first motor 110 based on a delay of a predetermined time period, for example, less than a tenth of a second. The predetermined time period for each delay may be the same time period, or may be different time periods depending on structural and electrical characteristics of each motor. While in neutral, the motors change speed so that when the new gear is engaged, they are at the correct speed relationship relative to the new gear and the vehicle speed In S633, S643, ramp rate and sequence of actual torque or speed are set. In a gear downshift, the torque change of the first motor 110 will be initiated before the torque change of the second motor 120. In S633, S643, the control unit controls torque ramp rates and the initiation sequence of torque change between the two motors such that impacts from backlash are substantially reduced, and vibration and noise phenomena are minimal. For example, when the dog clutches change during a shift, the dog clutch teeth cannot engage unless the rpm difference between the two is less than some amount (generally <50 rpm, but may vary between transmissions). If this small of a gap between RPM is not achieved, the result may be a loud noise from the teeth slamming together, or the teeth may not engage. (i.e., teeth are moving too fast to slide into each other).

In some embodiments, the shifting of gears in the transmission is speed synchronized between the speed of both motor(s) and the vehicle speed from the perspective of the oncoming gear dog clutch. Synchronization of motor speeds and vehicle speed is such that when dog clutches are changed during a gear shift, the dog clutch teeth engage when the speed difference between the two dog clutches is less than a predetermined amount, for example, less than 50 rpm. By controlling both motors to synchronize with the vehicle speed, the time to shift gears is faster.

In S635, S645, once the motors reach a target speed, they can engage a gear again. For example, once the speed gets to 1000 rpm, the torque is set to zero again (maintaining 1000 rpm) and then, dog clutch for $2^{nd}$ gear can be engaged. The speed of each motor may be determined by checking the speed change of the respective motor shaft. To engage a gear, in S647, both motors go to zero torque. In S649, the gear is engaged, and control goes back to S401.

Numerous modifications and variations of the present invention are possible in light of the above teachings. It is therefore to be understood that within the scope of the appended claims, the invention may be practiced otherwise than as specifically described herein.

The invention claimed is:

1. A control apparatus for a drive system of an electric vehicle, wherein the drive system includes a first motor connected to a second motor by a first spline, and a second spline connecting the second motor to a transmission, the control apparatus comprising circuitry configured to
in positive driving traction, initiate torque or speed change of the first motor and delay torque or speed change of the second motor,
in negative driving traction, initiate torque or speed change of the second motor and delay torque or speed change of the first motor,
in downshift of the transmission, initiate torque or speed change of the first motor and delay torque or speed change of the second motor, and
in upshift of the transmission, initiate torque or speed change of the second motor and delay torque or speed change of the first motor.

2. The control apparatus of claim 1, wherein the delay in torque or speed change is less than a tenth of a second.

3. The control apparatus of claim 1, wherein in the negative driving traction, the delay, of the torque or speed change of the first motor is such that a gap in teeth of the first spline and a connection to the first motor is kept closed.

4. The control apparatus of claim 1, wherein the circuitry determines a target torque or speed for each motor that maximizes power conversion efficiency of the motors.

5. The control apparatus of claim 1, wherein gear shifting in the transmission is accomplished by controlling, via the circuitry, speed synchronizing between motor speed of both of the first and second motors and vehicle speed measured at a clutch for an oncoming gear.

6. The control apparatus of claim 1, wherein the positive driving traction is where a first motor connection pushes teeth of the first spline based on an acceleration indication from an acceleration pedal of the electric vehicle.

7. The control apparatus of claim 6, wherein the negative driving traction is where mass of the electric vehicle is pulling the first motor such that the first motor connection contacts the teeth of the first spline on a side opposite a side of the teeth that is pushed,
wherein the negative driving traction is based on a change of the accelerator pedal from the acceleration indication to a back force indication.

8. The control apparatus of claim 1, wherein in the downshift of the transmission, the circuitry sets an operating mode of each motor to be in one of torque mode or speed mode.

9. The control apparatus of claim 1, wherein in the upshift of the transmission, the circuitry sets an operating mode of each motor to be in one of torque mode or speed mode.

10. The control apparatus of claim 9, wherein when the motors reach a target speed, set both motors to zero torque and engage a gear in the transmission.

11. A control method for a drive system of an electric vehicle, wherein the drive system includes first motor connected to a second motor by a first spline, and a second spline connecting the second motor to a transmission, the control method comprising
in positive driving traction, initiating torque or speed change of the first motor and delaying torque or speed change of the second motor;
in negative driving traction, initiating to or peed change of the second motor and delaying torque or speed change of the first motor;
in downshift of the transmission, initiating torque or speed change of the first motor and delaying torque or speed change of the second motor; and
in upshift of the transmission, initiating torque or speed change of the second motor and delaying torque or speed change of the first motor.

12. The control method of claim 11, wherein the delaying in torque or speed change is a delay less than a tenth of a second.

13. The control method of claim 11, wherein in the negative driving traction, the delaying of the torque or speed change of the first motor is such that a gap in teeth of the first spline and a connection to the first motor is kept closed.

14. The control method of claim 11, further comprising determining a target torque or speed for each motor that maximizes power conversion efficiency of the motors.

15. The control method of claim 11, further comprising controlling, during gear shifting in the transmission, speed synchronization between motor speed of both of the first and second motors and vehicle speed measured at a clutch for an oncoming gear.

16. The control method of claim 11, wherein the positive driving traction includes a first motor connection pushing, teeth of the first spline based on an acceleration indication from an acceleration pedal of the electric vehicle.

17. The control method of claim 16, wherein the negative driving traction includes pulling, by mass of the electric vehicle, the first motor such that the first motor connection contacts the teeth of the first spline on a side opposite a side of the teeth that is pushed,
wherein the negative driving traction includes changing of the accelerator pedal from the acceleration indication to a back force indication.

18. The control method of claim 11, further comprising, in the downshift of the transmission, setting an operating mode of each motor to be in one of torque mode or speed mode.

19. The control method of claim 11, further comprising, in the upshift of the transmission, setting an operating mode of each motor to be in one of torque mode or speed mode.

20. The control method of claim 19, further comprising, when the motors reach a target speed, setting both motors to zero torque and engaging a gear in the transmission.

* * * * *